United States Patent [19]

Unterlander et al.

[11] Patent Number: 5,035,603
[45] Date of Patent: Jul. 30, 1991

[54] APPARATUS FOR ALIGNING A PARISON WITH A BLOW MOLD

[75] Inventors: Rick Unterlander, Holland Landina; Tai C. Fok, Mississauga, both of Canada

[73] Assignee: Husky Injection Molding Systems Ltd., Bolton, Canada

[21] Appl. No.: 487,854

[22] Filed: Mar. 5, 1990

[51] Int. Cl.⁵ .............................................. B29C 49/42
[52] U.S. Cl. .................................. 425/522; 425/526; 425/534
[58] Field of Search ............... 425/522, 534, 535, 533, 425/526; 264/535, 536, 541, 524, 525, 542

[56] References Cited

U.S. PATENT DOCUMENTS

| | | | |
|---|---|---|---|
| 3,159,697 | 12/1964 | Tocci | 264/541 |
| 3,669,603 | 6/1972 | Keller et al. | 425/522 |
| 4,233,010 | 11/1980 | Suzuki | 425/534 X |
| 4,437,825 | 3/1984 | Harry et al. | 425/534 X |
| 4,483,436 | 11/1984 | Kirshnakumar et al. | 425/534 X |
| 4,540,543 | 9/1985 | Thomas et al. | 425/534 X |
| 4,690,633 | 9/1987 | Schad et al. | 264/535 X |
| 4,909,978 | 3/1990 | Hasegawa et al. | 425/534 X |

Primary Examiner—Richard L. Chiesa
Attorney, Agent, or Firm—Bachman & LaPointe

[57] ABSTRACT

Apparatus includes a blow mold for forming a blown article from a parison and a rotatable mandrel for holding a parison to be blown. The apparatus provides for moving the mandrel and parison into the blow mold, locating the mandrel and parison thereon into alignment with the blow mold and maintaining the alignment in the blow mold.

8 Claims, 3 Drawing Sheets

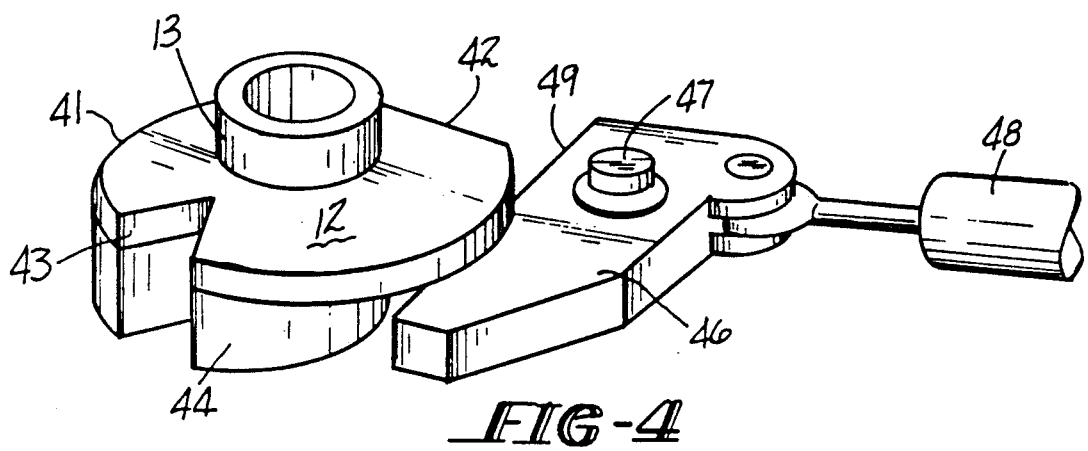
*FIG-4*
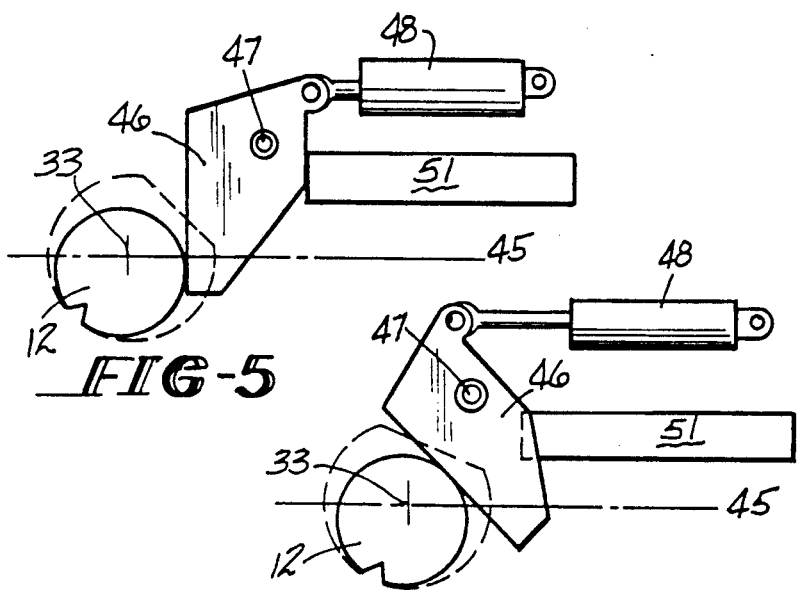
*FIG-5*
*FIG-6*
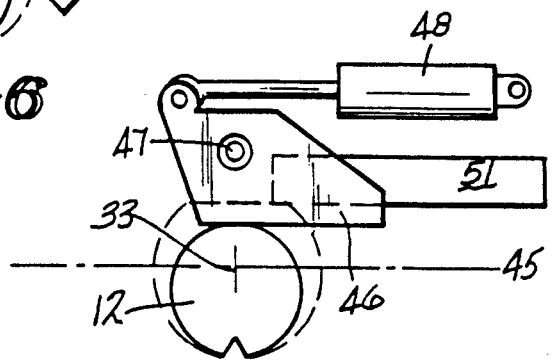
*FIG-7*

APPARATUS FOR ALIGNING A PARISON WITH A BLOW MOLD

BACKGROUND OF THE INVENTION

The reheat and stretch blow molding of plastic preforms or parisons sometimes requires that the preform be specifically located in relation to the blow mold so that the shape of the blown article is accurately registered. For example, the neck finish of the preform should desirably be properly located in relation to the blow mold, especially for non-symmetrical preforms, so that the shape of the blown article is correctly registered in relation to the neck finish, or thread start and/or finish portion of the article.

The apparatus described in U.S. Pat. No. 4,690,633 carries preforms on pallets from a loading station to a finishing or blowing station via a conditioning station. The preform is blown at the blowing station and then the blown article moved to an unloading station. Preforms of non-symmetrical shape can be transported by the pallets in this device; however, the preform must be properly positioned immediately prior to the blowing stage and the positioning must be maintained in the blowing stage so that the body shape of the blown article is correctly registered. In the above apparatus, the preforms are correctly located at the loading station since the preforms are removed from the injection molds using a robot and take off plate which directly places the preforms onto the mandrels in the loading station. Thereafter, the preform is firmly held by the mandrel throughout the preform's passage through the device. However, the mandrels spin during their passage through the conditioning station in order to impart the desired temperature conditions and this spinning changes the orientation of the preforms.

It is therefore, an object of the present invention to provide an apparatus which properly positions the preform prior to blowing and maintains the correct positioning at the blow station.

It is a still further object of the present invention to provide an apparatus as aforesaid which is suitable for use with non-symmetrical preforms and which is suitable for use with preforms held on mandrels which spin during a temperature conditioning cycle.

Further objects and advantages of the present invention will appear hereinbelow.

SUMMARY OF THE INVENTION

In accordance with the present invention, it has now been found that the foregoing objects and advantages can be readily obtained. The apparatus of the present invention aligns a parison with the blow mold and maintains the alignment in the blow mold. The apparatus comprises: a blow mold for forming a blown article from a parison; a mandrel, generally rotatable, for holding the parison to be blown; means for moving the mandrel and parison into the blow mold; and location means for moving the mandrel and parison thereon into alignment with the blow mold and including means for maintaining the alignment in the blow mold. The mandrel preferably includes a flat plate with a projection thereon for holding the parison. An eccentric cam preferably is connected to the plate and depends therefrom. A movable arm is engageable with the cam upstream of the blow mold wherein the arm rotates the cam and mandrel into alignment with the blow mold.

The flat plate includes a notch. A dog is provided upstream of the blow mold wherein the dog engages the notch when the mandrel is properly aligned with the blow mold and maintains the engagement and alignment in the blow mold so that the parison maintains its alignment in the blow mold.

In addition, the plate includes a flat portion opposed to the notch and an alignment block is provided upstream of the blow mold. In accordance with the present invention, when the flat portion is aligned with the alignment block by the location means the mandrel is permitted to pas the alignment block. At the same time, the notch and dog are engaged assuring that the alignment will be maintained in the blow mold.

The apparatus of the present invention is particularly suitable for use with non-symmetrical parisons and assures correct alignment despite the use of rotatable mandrels.

In the preferred embodiment, a conditioning means is provided upstream of the blow mold for conditioning the temperature of the parison. The mandrel includes a flat plate with a major diameter, a flat portion and a notch opposed to the flat portion. The location means includes means for positioning the arm adjacent and contacting the cam and pivot means connected to the arm, wherein the arm pivots around the pivot means.

Further features and advantages of the present invention will appear hereinbelow.

BRIEF DESCRIPTION OF THE DRAWINGS

The present invention will be more readily understandable from a consideration of the accompanying drawings, wherein:

FIG. 4 is a perspective view of the arm and cam engagement; and

FIGS. 5, 6 and 7 are schematic top views of the arm and cam engagement in various positions.

DETAILED DESCRIPTION

Figure 1:
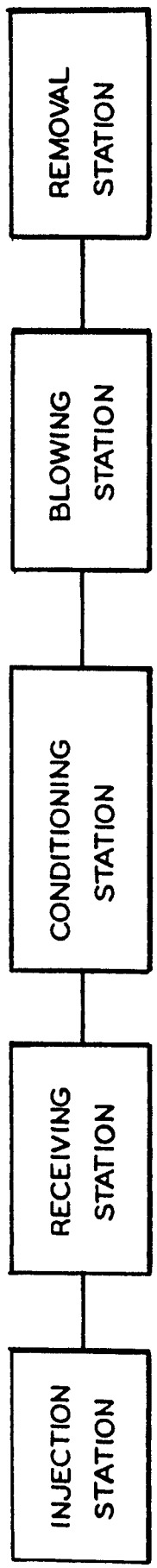
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to mandrels, preferably by a robot, to temperature conditioning station where the temperature is adjusted so as to be suitable for blowing and biaxial orientation (if desired), to the blowing station, and finally to the blown article removal station. The cycle is shown in U.S. Pat. No. 4,690,633, the disclosure of which is hereby incorporated by reference. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to aligning the parison, especially a non-symmetrical parison, with the blow mold and maintaining this alignment. With non-symmetrical parisons especially, after traversing a temperature conditioning station on a rotating mandrel, the parisons are not aligned properly, and the proper alignment must be achieved quickly, reliably, conveniently and repetitively so as not to impede the overall speed of the cycle. The present invention achieves this goal.

Figure 2:
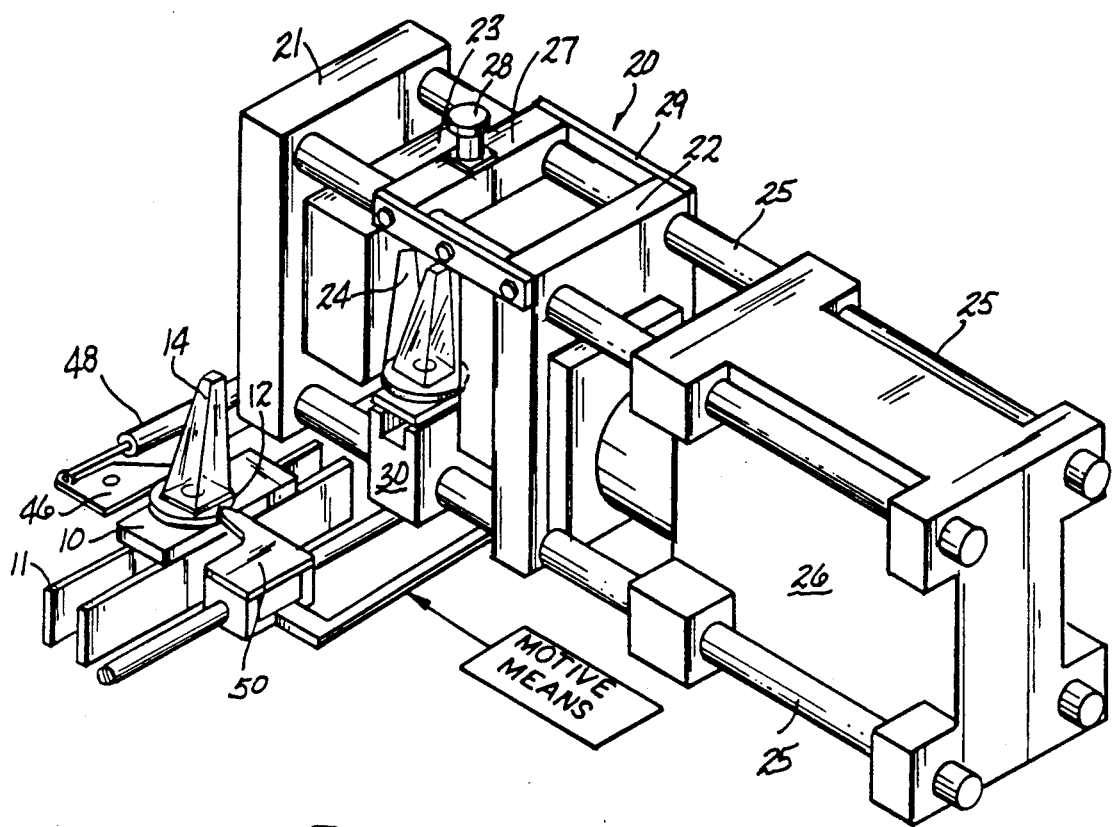
FIG. 2 is an isometric view of the finishing station.

FIG. 2 is a schematic view of the mandrel with parison thereon aligned and ready to be received by the blow mold. FIG. 2 shows a single mandrel carrying a single parison; however, it should be understood that the present invention may readily be used when the mandrel carries a plurality of parisons or when a plurality of mandrels carry a plurality of parisons. For convenience in the following discussion the present invention has been described with a single mandrel carrying a single parison.

Referring to FIG. 2, pallets 10 are retained in channel track 11 having been transferred thereto from the conditioning station by means not shown. Pallets 10 hold rotatable mandrels 12 which in turn hold parisons or preforms 14 via projection 13, shown more clearly in FIGS. 4-7. As can be seen in FIG. 2 the parison is non-symmetrical since the present invention is most useful with this type of parison as it requires alignment after traversing a conditioning station on a rotating mandrel.

Figure 3:
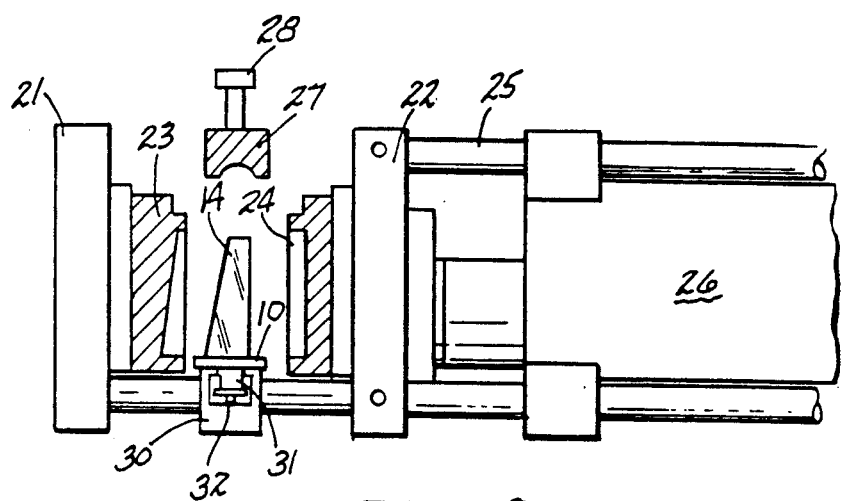
FIG. 3 is a schematic view of the finishing station.

Blowing station or finishing station 20 includes fixed platen 21 and movable platen 22 with blow mold half 23, and blow mold half 24 therebetween in the shape of the bottle to be formed. Movable platen 22 moves on tie rods 25 activated by motor 26. Base mold 27 is positioned above mold halves 23 and 24 to form the bottle bottom with piston 28 connected thereto for moving the bottom mold into appropriate alignment for formation of the desired base for the bottle and motive means (not shown) connected thereto for activating said piston. Linkage means 29 are provided connected to the movable platen 22 and bottom mold 27 in order to maintain the desired positioning thereof. For clarity only the top linkage means are shown in FIG. 2. Channel track 30 sits spaced from but closely adjacent to channel track 11 so that pallets 10 can readily move into position in the blow mold. Pallets 10 may include depending leg 31 which may be engaged by a chain link (not shown) or any desired motive means for moving the pallet. As shown in FIG. 2, one mandrel-parison assembly is in position in the blow mold while a second is ready to be moved into the blow mold. FIG. 3 shows the mandrel-parison assembly in the blow mold.

FIGS. 4-8 show the details of the alignment process in accordance with the present invention. Mandrels 12 are in the form of a flat plate rotatable about mandrel axis 33 and carrying a projection 13 thereon for holding the neck region of the parison. The shape of the neck region will determine the shape of the projection, e.g., in FIG. 4 the projection is circular. Naturally, the projection will rotate with the rotation of the mandrel so that the parison will rotate during its passage through the conditioning station. Naturally, any suitable means may be provided for rotating the mandrel, as for example, rotatable projection 32 (FIG. 3) integral with and depending from mandrel 12 which may be contacted by belts or chains (not shown) at the conditioning station causing rotation of the projection and mandrel. As can be clearly seen in FIG. 4, mandrel 12 is a flat plate and has a major diameter 41 with a flat portion 42 and a notch 43 opposite flat portion 42. Beneath the major diameter 41 the mandrel 12 carries eccentric cam 44 connected to the mandrel and depending therefrom. Mandrel 12 mounted on pallet 10 as shown in FIG. 2 travels along centerline 45 past movable arm 46. The movable arm pivots around post 47 and is mounted on the machine base. Arm 46 is moved into a first position by cylinder means 48. As pallet 100 carrying rotatable mandrel 12 advances out of the conditioning station, cam 44 contacts arm 46. The arm is not firmly held and therefore does not prevent passage of the pallet along the track. Instead, the cylinder means 48 acts like a spring and exerts pressure on the arm which in turn causes the cam and mandrel to rotate, if necessary, to present the least resistance to the passage of the cam and mandrel past the arm. FIGS. 5, 6 and 7 schematically show the moving mandrel and arm in three positions as the mandrel passes the arm. The arm 46 engages cam 44 regardless of the cam's initial orientation with respect to the arm. Thus, mandrel 12, major diameter 41 and cam 44 are caused to rotate about axis 33 by the pressure exerted on cam 44 by arm 46. As the pallet advances towards the blow station (to the right in FIGS. 6 and 7), arm 46 pivots around post 47 while maintaining pressure from cylinder 48 on cam 44. In the final position shown in FIG. 7, arm 46 bottoms on the cylinder stroke and is held so that arm face 49 is parallel to centerline 45 and mandrel face 42 ensuring that the pallet can pass the arm with cam 44 in such an orientation that notch 43 and flat 42 (on the major diameter 41) are oriented in a predetermined alignment. In addition, alignment block 51 is provided upstream of the blow mold as shown in FIGS. 5-7. The alignment block is in cooperating relationship with flat portion 42. Thus, as shown in FIG. 7 when flat portion 42 is aligned with the alignment block 51 the parison and mandrel are properly aligned and the mandrel is permitted to pass the alignment block. In the predetermined alignment dog 50 will engage notch 43 and remain engaged into the blow mold to insure retention of the alignment. Dog 50 may be driven by suitable motive means to engage notch 43 upstream of the blow mold as shown in FIG. 2, maintain the engagement to and in the finishing station and to release the engagement in the blow mold. The pallet with formed article is then transferred to a finished article removal station as shown in FIG. 1 for removal of the finished article and repeat of the cycle.

Thus, in accordance with the present invention, the previously spinning mandrel is quickly and efficiently located and oriented for seating in the blow mold. This is accomplished without interruption during the passage of the mandrel along a track and the alignment is easily retained during the passage of the mandrel into the finishing station.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for aligning a parison with a blow mold which comprises: a blow mold for forming a blown article from a parison; a mandrel including a flat plate with a projection thereon for holding the parison to be blown in a predetermined position, wherein said mandrel is rotatable so that the parison can be rotated; means for moving the mandrel and parison into the blow mold; location means for rotating the mandrel and parison thereon into alignment with the blow mold including an eccentric cam connected to the plate and depending therefrom, and a movable arm engagable with the cam upstream of the blow mold, wherein the arm rotates the cam and mandrel into alignment with the blow mold thereby aligning the parison with the blow mold; and means for maintaining the alignment in the blow mold.

2. Apparatus according to claim 1, wherein the parison is a non-symmetrical parison.

3. Apparatus according to claim 1 including means upstream of the location means for conditioning the temperature of the parison.

4. Apparatus according to claim 1 including means for positioning the arm into contacting relationship with the cam, and pivot means connected to the arm, wherein the arm pivots around the pivot means.

5. Apparatus for aligning a parison with a blow mold which comprises: a blow mold for forming a blown article from a parison; a mandrel including a flat plate with a projection thereon for holding the parison to be blown, wherein the mandrel is rotatable so that the parison can be rotated; means for moving the mandrel and parison into the blow mold; location means for moving the mandrel and the parison thereon into alignment with the blow mold including an eccentric cam connected to the plate and depending therefrom, and a movable arm engagable with the cam upstream of the blow mold, wherein the arm rotates the cam and mandrel into alignment with the blow mold thereby aligning the parison with the blow mold; and means for maintaining the alignment in the blow mold, wherein the flat plate includes a notch and dog upstream of the blow mold engagable with the notch when the mandrel and parison are aligned with the blow mold, including means for maintaining it engagable between the dog and notch when the parison is in the blow mold so that the parison maintains its alignment in the blow mold.

6. Apparatus according to claim 5 wherein the flat plate has a major diameter and a flat portion, and wherein the notch is opposite the flat portion.

7. Apparatus according to claim 6 wherein the arm includes a face engageable with the cam, wherein the face of the arm rotates the cam to align the mandrel and parison with the blow mold and to align the flat portion of the flat plate with the face of the arm.

8. Apparatus according to claim 6 including an alignment block upstream of the blow mold in cooperating relationship with the flat plate operative to permit the mandrel and parison to pass the alignment block when the mandrel and parison are aligned with the blow mold.

* * * * *

UNITED STATES PATENT AND TRADEMARK OFFICE
CERTIFICATE OF CORRECTION

PATENT NO. : 5,035,603
DATED : JULY 30, 1991
INVENTOR(S) : RICK UNTERLANDER ET AL.

It is certified that error appears in the above-identified patent and that said Letters Patent is hereby corrected as shown below:

IN THE COVER PAGE, UNDER "INVENTORS:" AFTER "MISSISSAUGA," DELETE "BOTH OF CANADA" AND INSERT --; AND OSCAR MUNOZ, MISSISSAUGA, ALL CITIZENS OF CANADA.--

IN COLUMN 2, LINE 12, DELETE "PAS" AND INSERT --PASS--.

IN COLUMN 4, LINE 4, DELETE "100" AND INSERT --10--.

Signed and Sealed this

Third Day of November, 1992

Attest:

DOUGLAS B. COMER

*Attesting Officer*     *Acting Commissioner of Patents and Trademarks*